(12) United States Patent
Wu et al.

(10) Patent No.: US 12,722,106 B1
(45) Date of Patent: Sep. 1, 2026

(54) FILTER ADAPTER, FILTER SYSTEM AND INSTALLATION METHOD

(71) Applicant: KOROS TECHNOLOGY (SHENZHEN) CO., LTD., Shenzhen (CN)

(72) Inventors: Huaping Wu, Shenzhen (CN); Qi Wang, Shenzhen (CN); Dezhen Xie, Shenzhen (CN); Defu Wu, Shenzhen (CN)

(73) Assignee: KOROS TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 19/331,786

(22) Filed: Sep. 17, 2025

(30) Foreign Application Priority Data

Aug. 28, 2025 (CN) ........................ 202521849428.5

(51) Int. Cl.
*B01D 35/30* (2006.01)
*B01D 35/157* (2006.01)

(52) U.S. Cl.
CPC ....... *B01D 35/306* (2013.01); *B01D 35/1573* (2013.01); *B01D 2201/16* (2013.01); *B01D 2201/4046* (2013.01)

(58) Field of Classification Search
CPC .............. B01D 35/306; B01D 35/1573; B01D 2201/16; B01D 2201/4046; B01D 35/147; B01D 35/30; F16L 37/252
USPC ........................................................ 210/234
See application file for complete search history.

(56) References Cited

U.S. PATENT DOCUMENTS 6,360,764 B1 * 3/2002 Fritze .................. B01D 35/157 137/15.01
2009/0236277 A1 * 9/2009 Kurth ....................... C02F 9/20 210/234
2013/0341917 A1 * 12/2013 Lehmann ............. F16L 37/248 285/402

* cited by examiner

*Primary Examiner* — Bobby Ramdhanie
*Assistant Examiner* — William Addison Geisbert
(74) *Attorney, Agent, or Firm* — Andrew C. Cheng

(57) ABSTRACT

The present disclosure provides a filter adapter and a filter system, and further provides a specific filter installation method, which can achieve multiple guarantees to prevent liquid leakage during the disassembly and assembly of a filter. The filter adapter is configured to connect a connector base and a filter, and includes an adapter body, wherein the adapter body is provided with an accommodating cavity for accommodating a head of the filter, at least two shut-off valve passages are provided in the accommodating cavity, and at least two columnar shut-off valves configured to connect a fluid passage of the filter with a fluid passage of the connector base, wherein the at least two columnar shut-off valves axially move within the shut-off valve passages and are restricted from rotating.

17 Claims, 12 Drawing Sheets

FILTER ADAPTER, FILTER SYSTEM AND INSTALLATION METHOD

TECHNICAL FIELD

The present disclosure relates to the technical field of filtration equipment, and more particularly to a filter adapter, a filter system and an installation method.

BACKGROUND

In the prior art, a connector of a water system pipeline, which connects an inlet of liquid to be filtered and an outlet of filtered liquid, is usually fixed in an equipment arrangement. A detachable filter is connected to the connector. When it is necessary to replace or repair the filter, the old filter needs to be disassembled and a new filter needs to be installed. The installation structure of the filter in the prior art requires multiple steps for installation, the disassembly and assembly process is complicated, and the assembly difficulty is high.

Taking refrigeration equipment such as a refrigerator as an example, to facilitate user use, many refrigerator products are equipped with ice makers or external water dispensers. These require a water purification filter device to supply purified water produced by the water purification filter device to the ice maker for ice making or to the dispenser for direct use.

On the other hand, in the prior art, although a valve body is provided on the connector of the water system pipeline connected to the equipment, so that when the filter is disassembled, the valve body on the connector automatically closes to prevent leakage of the water system pipeline of the refrigerator, liquid residues inside the filter is likely to leak during the disassembly process. Furthermore, a mounting portion of the refrigerator filter is relatively small, making it difficult to clean and organize.

SUMMARY

In view of the deficiencies in the prior art, an objective of the present disclosure is to provide a filter adapter capable of achieving multiple guarantees to prevent liquid leakage during the disassembly and assembly process. To achieve the above objective, the present disclosure provides the following technical solutions:

In one aspect, the present disclosure provides a filter adapter for connecting a connector base and a filter, comprising an adapter body, where the adapter body is provided with an accommodating cavity for accommodating a head of the filter, at least two shut-off valve passages are provided in the accommodating cavity, and a main passage is configured to allow a diverter switch at the head of the filter to pass through; and at least two columnar shut-off valves for connecting a fluid passage of the filter with a fluid passage of the connector base, where the at least two valves axially move within the shut-off valve passages and are restricted from rotating.

As a further improvement of the present disclosure, an upper end of each of the columnar shut-off valves is connected to an engaging portion, and the engaging portion is configured to be engaged with the head of the filter and restricts axial movement of the columnar shut-off valve relative to the filter.

As a further improvement of the present disclosure, a first water inlet and a first water outlet are provided on the two columnar shut-off valves at the same radial horizontal height, and first sealing rings are disposed at positions above and below the water inlet and the water outlet.

As a further improvement of the present disclosure, the adapter body is provided with a first seat body and a second seat body, and guide grooves on the first seat body and the second seat body are in communication with each other; each of the guide grooves comprises at least an oblique or helical segment; and a gap is formed between the first seat body and the second seat body and configured to accommodate the engaging portions of the columnar shut-off valves.

As a further improvement of the present disclosure, the adapter body is provided with a locking member configured to form a locking connection with the connector base; and the locking member is provided with a linkage member cooperating with the filter, and the linkage member converts rotational motion of the filter to drive the locking member to lock with the connector base.

As a further improvement of the present disclosure, the locking member is located at an axial center of a lower end surface of the adapter body.

As a further improvement of the present disclosure, the accommodating cavity is configured to allow the diverter switch at the head of the filter to pass therethrough, and the linkage member converts rotational motion of the diverter switch to drive the locking member to lock with the connector base.

As a further improvement of the present disclosure, the locking member is rotatably connected to the adapter body at a defined rotational angle.

As a further improvement of the present disclosure, the locking member is a locking sleeve disposed on the adapter body; openings are formed at a lower end of the locking sleeve, each of the openings extends upward to form an alignment groove, and the alignment groove circumferentially extends to form a locking groove; and the locking grooves are configured to lockingly engage with the connector base, and the locking sleeve is rotatably connected to the adapter body at a defined rotational angle.

As a further improvement of the present disclosure, the linkage member comprises at least a start-position protrusion provided on an inner wall surface of the locking sleeve; the start-position protrusion abuts against the filter to synchronously move during rotation of the filter, and at least one limiting structure for restricting a rotational angle is disposed between the locking sleeve and the adapter body; and after the locking sleeve rotates relative to the adapter body to a limiting position, the start-position protrusion starts to disengage from abutment with the filter.

As a further improvement of the present disclosure, at least one limiting structure for restricting a rotational angle is disposed between the locking sleeve and the adapter body, and the limiting structure comprises one or more of: a limiting protrusion cooperating with another limiting protrusion, or a limiting protrusion cooperating with a limiting groove.

As a further improvement of the present disclosure, the adapter body is provided with a mounting cylinder, and the locking sleeve is disposed in the mounting cylinder in a limited rotation manner; a mounting hole is formed through a side wall of the mounting cylinder, and a limiting block that is movable axially along the mounting hole is disposed in the mounting hole; the locking sleeve is provided with a limiting groove cooperating with the limiting block; and when the columnar shut-off valves move axially to preset positions, outer wall surfaces of the columnar shut-off valves push the limiting block to move toward one side of the locking sleeve and urge the limiting block to abut against the limiting groove of the locking sleeve.

As a further improvement of the present disclosure, clearance recesses are provided on one side of the columnar shut-off valves close to a section of a lower end corresponding to the limiting block; and when the columnar shut-off valves move downward until the clearance recesses pass the position of the limiting block, the columnar shut-off valves reach the preset positions.

The present disclosure further provides a filter system. A filter comprises a bottle body, filter cartridges accommodated in the bottle body, and an end cover configured to seal the bottle body, where the filter is provided with a cylindrical protruding portion extending forward, and a second water inlet and a second water outlet are provided circumferentially on the protruding portion; and The filter further comprises a filter adapter configured to connect a connector base and the filter, where the filter adapter comprises an adapter body and the at least two columnar shut-off valves; the adapter body is provided with an accommodating cavity for accommodating a head of the filter, and the accommodating cavity is provided with at least two shut-off valve passages; the columnar shut-off valves move axially within the shut-off valve passages and are restricted from rotating, and the columnar shut-off valves are configured to connect a fluid passage of the filter with a fluid passage of the connector base; a first water inlet and a first water outlet are provided on radial side walls of the two columnar shut-off valves, respectively; the filter moves axially while rotating, and the axial movement of the filter drives the two columnar shut-off valves to move axially within the accommodating cavity; and when the filter rotates to a preset position, the first water inlet and the first water outlet of the two columnar shut-off valves are driven to be in communication with the second water inlet and the second water outlet of the protruding portion, respectively.

As a further improvement of the present disclosure, an upper end of each of the columnar shut-off valves is connected to an engaging portion, and the engaging portion is configured to be engaged with the head of the filter and restricts the axial movement of the columnar shut-off valve relative to the filter.

As a further improvement of the present disclosure, the adapter body is provided with a first seat body and a second seat body, and guide grooves on the first seat body and the second seat body are in communication with each other; each of the guide grooves comprises at least an oblique or helical segment; and a gap is formed between the first seat body and the second seat body and configured to accommodate the engaging portions of the columnar shut-off valves.

As a further improvement of the present disclosure, the filter system further comprises a connector base, where the connector base is configured to connect to an integrated waterway; the connector base is provided with a first shut-off valve at least in a water inlet passage; the filter axially moves while rotating, and the axial movement of the filter drives the two columnar shut-off valves to axially move within the accommodating cavity; and when rotating to the preset position, the filter drives water passages of the two columnar shut-off valves to be in communication with the second water inlet and the second water outlet of the protruding portion, respectively, and the columnar shut-off valves engage with the first shut-off valves and move and open the first shut-off valves.

As a further improvement of the present disclosure, each of the first shut-off valves comprises a valve body and a spring member configured to bias the valve body to close the first water inlet passage or the first water outlet passage, and when the adapter and the connector base are assembled in position, the columnar shut-off valves move axially to push the valve body axially to open the first water inlet passage or the first water outlet passage.

As a further improvement of the present disclosure, a first valve body for controlling flow diversion is provided in the connector base; a diverter switch is formed at a front end of the protruding portion of the filter and configured to drive the first valve body in the connector base, and a main passage is provided at an axial center of the accommodating cavity of the adapter body and configured to allow the diverter switch at the head of the filter to pass through.

As a further improvement of the present disclosure, the adapter body is provided with a locking member configured to form a locking connection with the connector base; the locking member is located at the axial center of the lower end surface of the adapter body; and the locking member is provided with a linkage member cooperating with the diverter switch, and the linkage member converts rotational motion of the diverter switch to drive the locking member to lock with the connector base.

As a further improvement of the present disclosure, the linkage member converts the rotational motion of the diverter switch to drive the locking member to lock with the connector base, and the locking member is rotatably connected to the adapter body at a defined rotational angle.

As a further improvement of the present disclosure, the locking member comprises a locking sleeve, and the locking sleeve is rotatably connected to the adapter body at a defined rotational angle; openings are formed at a lower end of the locking sleeve, each of the openings extends upward to form an alignment groove, and the alignment groove circumferentially extends to form a locking groove; and a locking pin is disposed on the connector base, and the locking grooves are configured to lockingly engage with the locking pin of the connector base.

The present disclosure further provides a method for installing a filter of the filter system as set forth, comprising a filter assembly method:

(1) two columnar shut-off valves of an adapter are aligned with a water inlet passage and a water outlet passage of the connector base, respectively; a diverter switch, columnar shut-off valves, a first shut-off valve and a first valve body are in initial positions; a second water inlet and a second water outlet of the filter are offset from a first water inlet and a first water outlet of the columnar shut-off valves; and the first shut-off valve closes at least a water inlet passage of the connector base, and the first valve body opens a diversion passage of the connector base;

(2) the filter is threadedly engaged with the adapter by rotation, the filter is rotated to a first preset angle, the filter drives the columnar shut-off valves to axially move to a first preset height, the diverter switch drives the locking member to rotate to the first preset angle, and the locking sleeve locks with the connector base;

(3) the filter is threadedly engaged with the adapter by further rotation, and the diverter switch of the filter is unlocked from the locking member; the filter is rotated to a second preset angle, and the second water inlet and the second water outlet of the filter are in communication with the first water inlet and the first water outlet of the columnar shut-off valves, respectively; and the filter drives the columnar shut-off valves to axially move to a second preset height, the columnar shut-off valves push the first shut-off valves to open, and the diverter switch fully opens the first valve body in the connector base.

In conclusion, the present disclosure has at least one of the following beneficial technical effects:

By adopting the above technical solutions, the present disclosure has the following advantages:

The filter adapter with the shut-off valves is provided to connect and install the filter and the connector base on the equipment. On one hand, a detachable adapter for the filter is provided, realizing the replaceability of assembly components for the filter and the connector base. When a connecting and installing structure is relatively easy to damage, only the adapter needs to be replaced to achieve renewal, reducing the warranty replacement cost for manufacturers.

The locking member is disposed on the locked adapter on the filter as a connecting member between the filter and the connector base. A locking structure between the filter and the connector base can be independently disposed, thereby enhancing the stability and strength of the locking structure.

The linkage member disposed on the locking member to cooperate with the filter can synchronously drive the locking member to install and lock with the connector base, realizing simple and rapid assembly among the filter, the adapter and the connector base, thereby facilitating more convenient and quicker operation for users.

In addition, since the columnar shut-off valves can move axially in the adapter body, the columnar shut-off valves can be partially or fully accommodated in the adapter body, reducing the damage rate during transportation.

On the other hand, during the disassembly and assembly process of the adapter with the filter and the connector base, the at least two columnar shut-off valves can block the outflow of liquid inside the filter, further preventing liquid leakage and improving the user experience for consumers.

DESCRIPTIONS OF THE REFERENCE SIGNS

Figure 1:
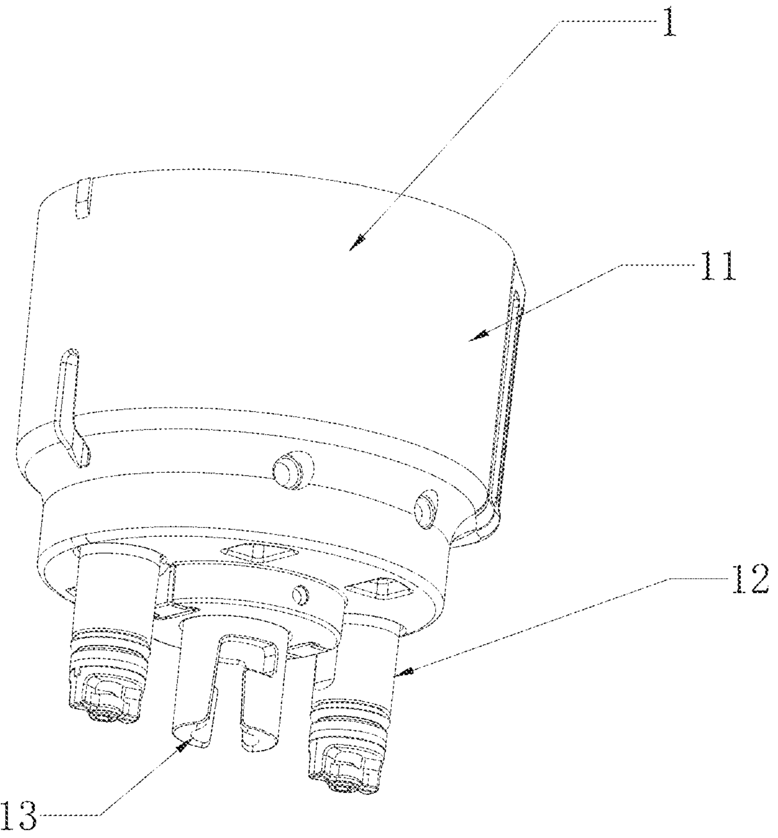
FIG. 1 is a schematic structural diagram of a filter adapter according to an embodiment of the present disclosure.
Figure 2:
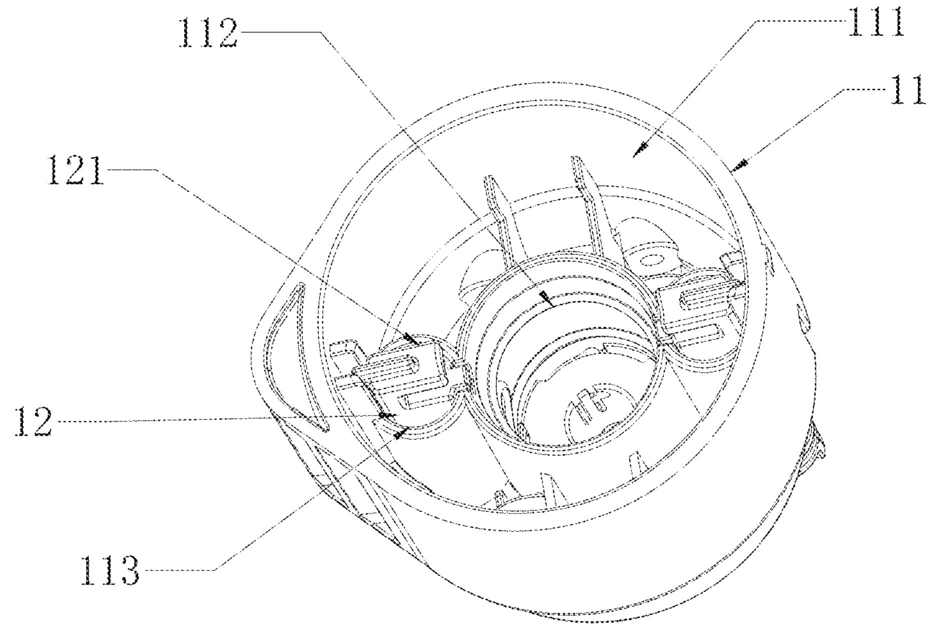
FIG. 2 is a schematic structural diagram of an accommodating cavity of the filter adapter according to the present disclosure.
Figure 3:
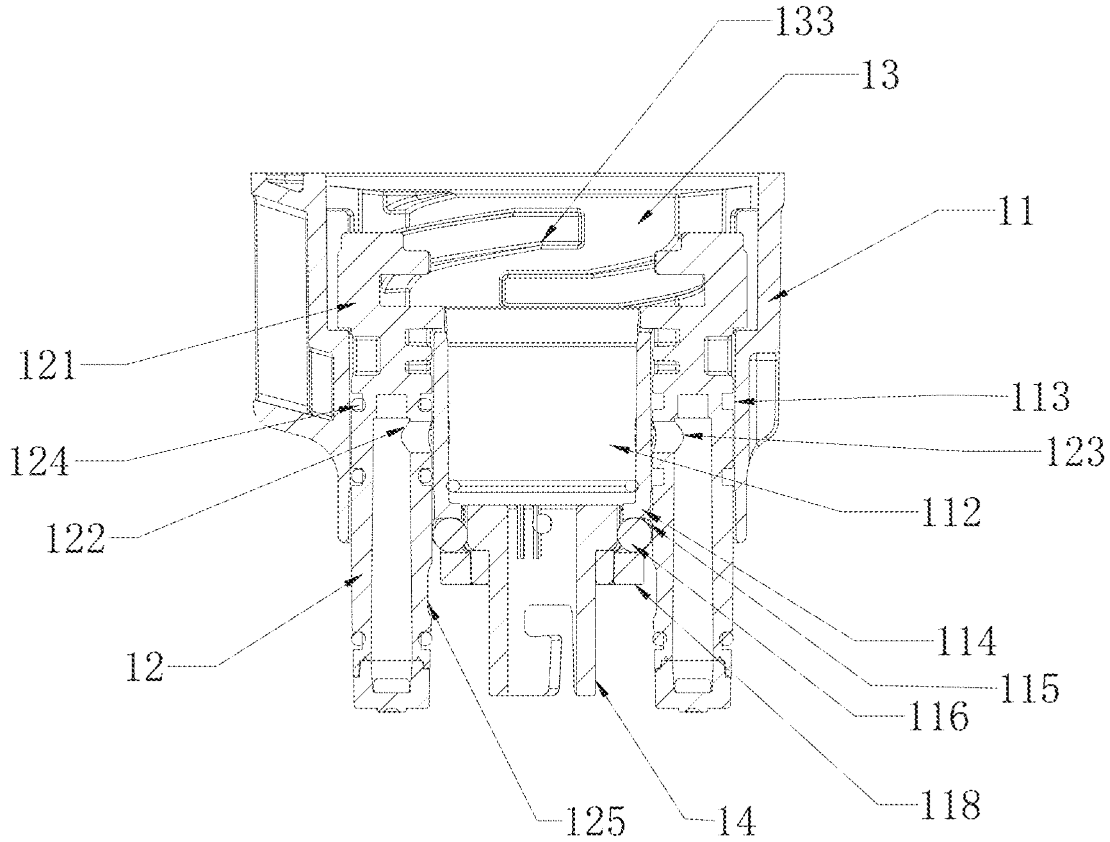
FIG. 3 is a longitudinal cross-sectional structural schematic diagram of the filter adapter according to the present disclosure.

Adapter; 11. Adapter body; 111. Accommodating cavity; 112. Main passage; 113. Shut-off valve passage; 114. Mounting cylinder; 115. Mounting hole; 116. Limiting block; 117. Mounting notch; 118. Mounting base; 12. Columnar shut-off valve; 121. Engaging portion; 122. First water inlet; 123. First water outlet; 124. First sealing ring; 125. Clearance recess; 13. Connecting seat; 131. First seat body; 132. Second seat body; 133. Helical groove; 134. Gap; 14. Locking member; 141. Locking sleeve; 142. Alignment groove; 143. Locking groove; 144. Start-position protrusion; 145. End-position protrusion; 146. Limiting groove; 147. First dowel pin; 148. Positioning arc groove; 149. Second dowel pin; Filter; 21. Bottle body; 22. Filter cartridge; 23. End cover; 231. Protruding portion; 232. Second water inlet; 233. Second water outlet; 234. Diverter switch; 235. Convex rib; 236. Second sealing ring; 237. Latching plate; 238. Protrusion; 3. Connector base; 31. Pipeline water inlet passage; 32. Pipeline water outlet passage; 33. First water inlet passage; 34. First water outlet passage; 35. Diversion passage; 36. First valve body; 37. First shut-off valve; 371. Valve body; 372. Spring member; 38. Locking pin.

DETAILED DESCRIPTION OF EMBODIMENTS

The embodiments of the present disclosure will be described in detail below, examples of which are illustrated in the accompanying drawings, where the same or similar reference numerals are used to indicate the same or similar members or members having the same or similar functions. The embodiments described below with reference to the accompanying drawings are exemplary and are intended to be illustrative of the present disclosure, but should not be construed as limiting the present disclosure.

In the description of the present disclosure, it should be noted that the terms “center”, “horizontal”, “upper”, “lower”, “left”, “right”, “vertical”, “horizontal”, “inner”, “outer”, and the like indicate orientations or positional relationships based on the orientations or positional relationships shown in the drawings, and are only for convenience of description and simplification of description of the present disclosure, but do not indicate or imply that the device or element referred to must have a specific orientation, be constructed and operated in a specific orientation, and thus, should not be construed as limiting the present disclosure. Unless otherwise specified, “a plurality of” means two or more.

In the description of the present disclosure, it should be noted that, unless otherwise explicitly specified or limited, the terms “mounted”, “connected” and “attached” are to be interpreted broadly, and may be, for example, fixedly connected. They may be detachably connected, or integrally connected, may be mechanically connected or electrically connected, may be directly connected or indirectly connected by means of an intermediate medium, and may also be an internal communication between two components. Those skilled in the art can understand the specific meanings of the above-mentioned terms in the present disclosure in specific situations.

Although the embodiments of the present disclosure have been shown and described, those skilled in the art will understand that various changes, modifications, substitutions, and variations can be made to these embodiments without departing from the principles and spirit of the present disclosure. The scope of the present disclosure is defined by the claims and equivalents thereof. Improvements made without inventive effort shall also fall within the protection scope of the present disclosure.

Figure 4:
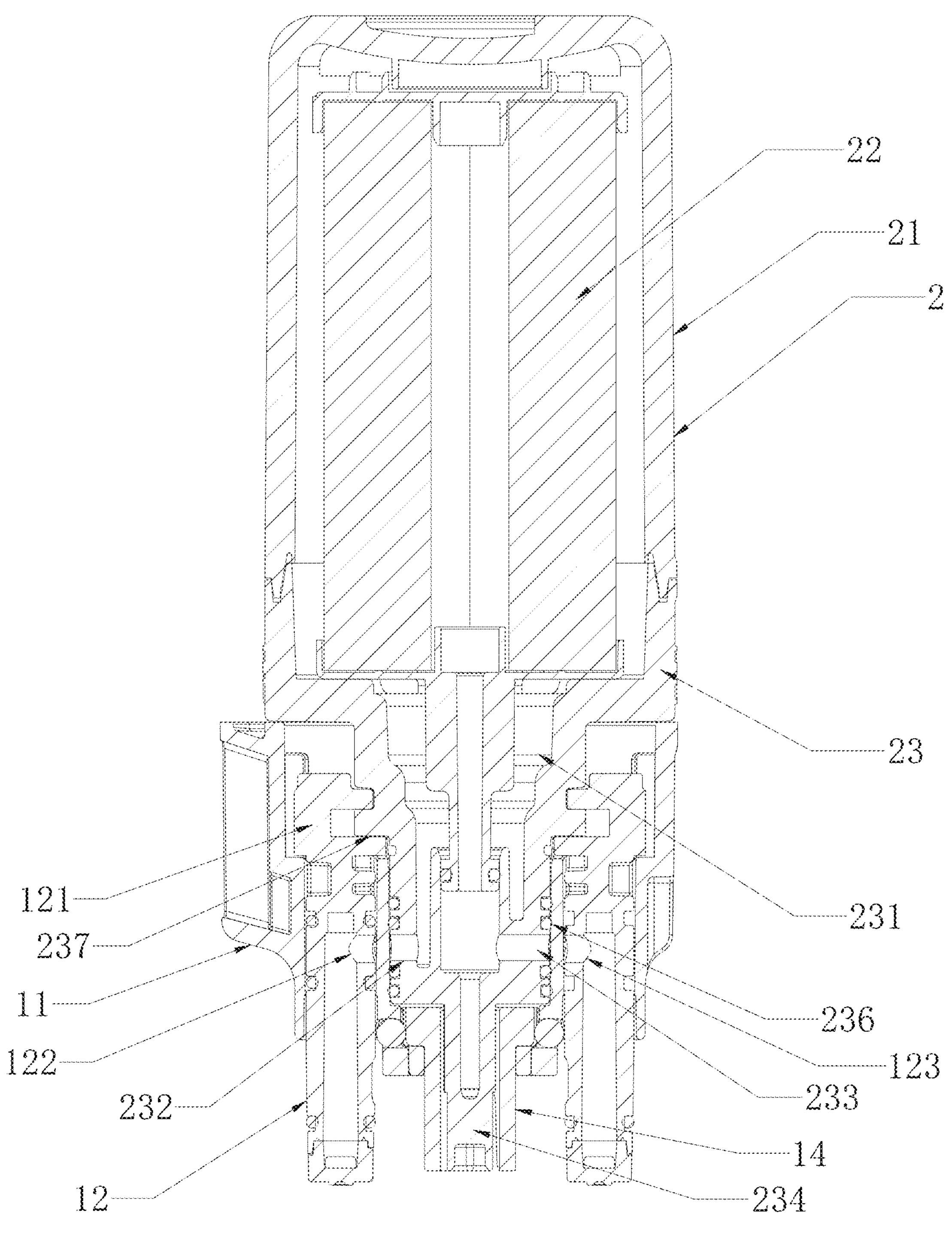
FIG. 4 is a schematic diagram of an installation structure of the filter and the filter adapter according to the present disclosure.
Figure 5:
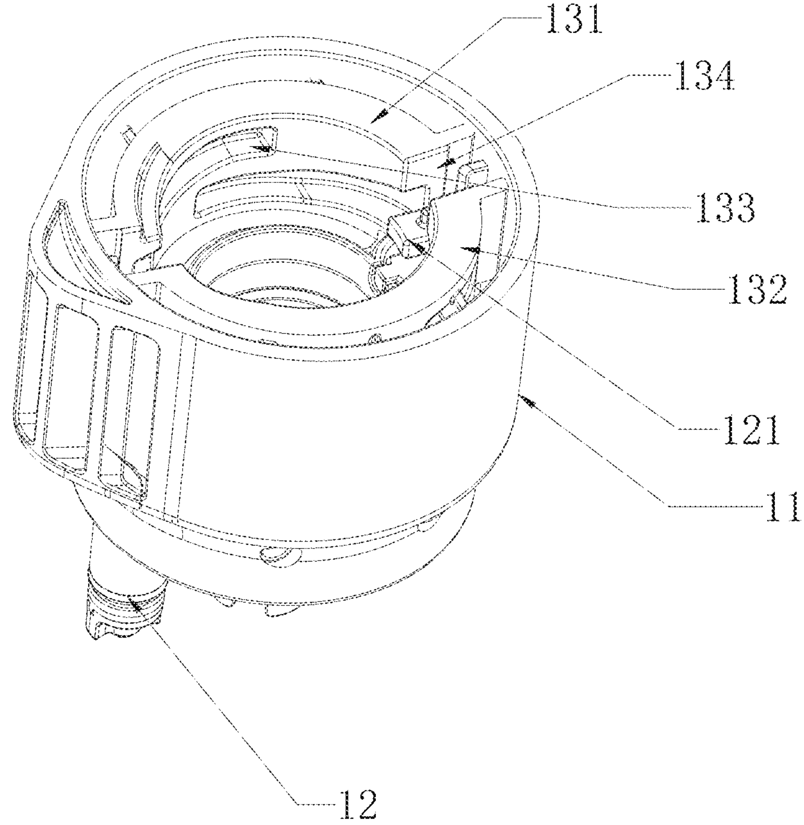
FIG. 5 is a structural schematic diagram of the filter adapter with a connecting seat according to the present disclosure.
Figure 11:
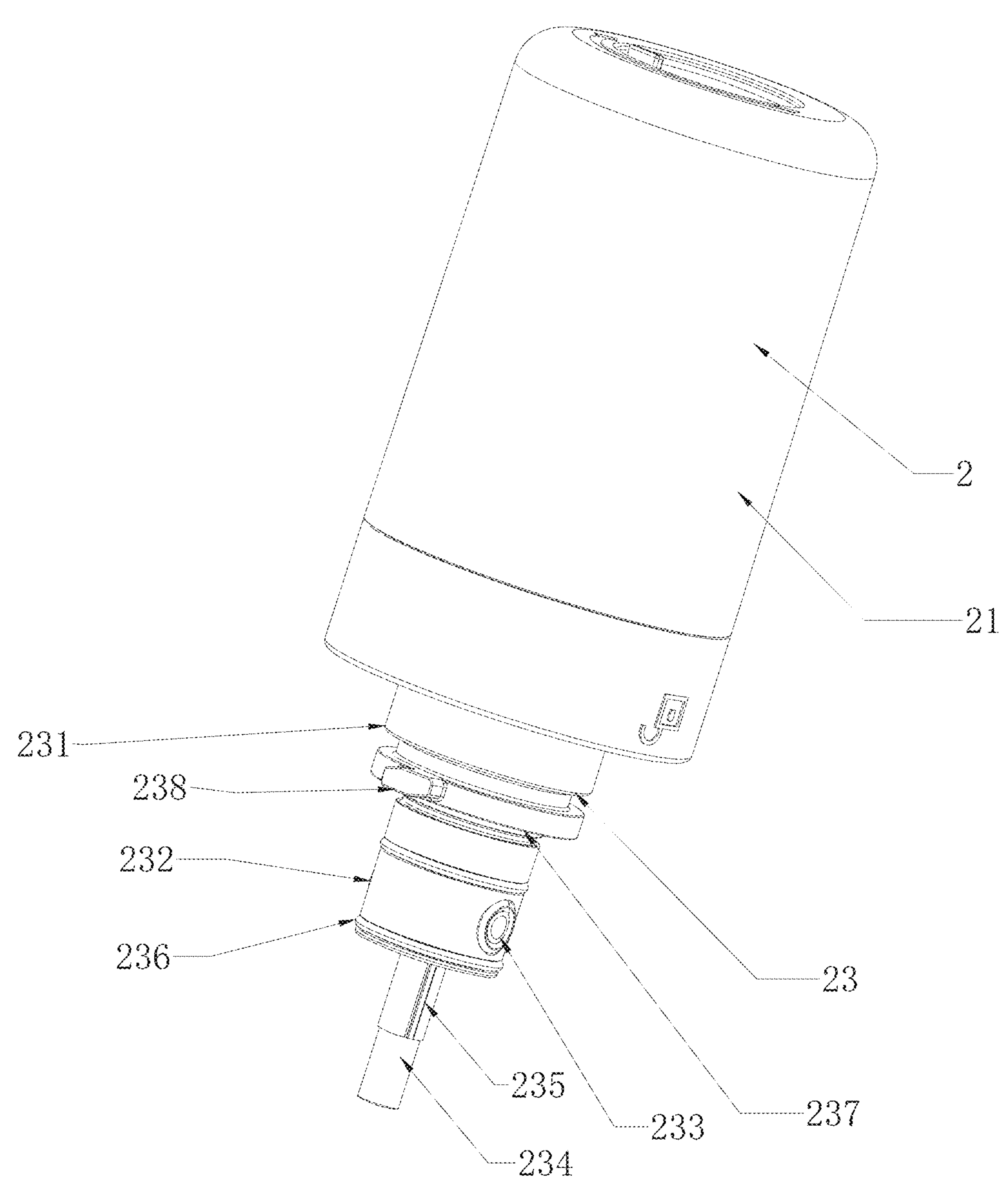
FIG. 11 is a schematic structural diagram of the filter according to the present disclosure.

As shown in FIG. 11 and FIG. 4, the filter 2 of the present disclosure includes a bottle body 21, filter cartridges 22 accommodated in the bottle body 21, and an end cover 23 used to seal the bottle body 21. The filter cartridges 22 are in a hollow cylindrical shape to form a water inlet passage and a water outlet passage in the bottle body 21. Two filter cartridge mounting seats disposed up and down are disposed in the bottle body 21. One filter cartridge mounting seat extends downward to form a protruding post, and the protruding post is provided with a water outlet passage in communication with the hollow of the filter cartridge 22. The end cover 23 extends forward to form a cylindrical protruding portion 231. The protruding portion 231 is provided with a water inlet passage surrounding the protruding post and a water outlet passage which is connected to and in communication with the protruding post. A second water inlet 232 and a second water outlet 233 are circumferentially provided on the protruding portion 231. Preferably, second sealing rings 236 are disposed at positions above and below the second water inlet 232 and the second water outlet 233.

Figure 12:
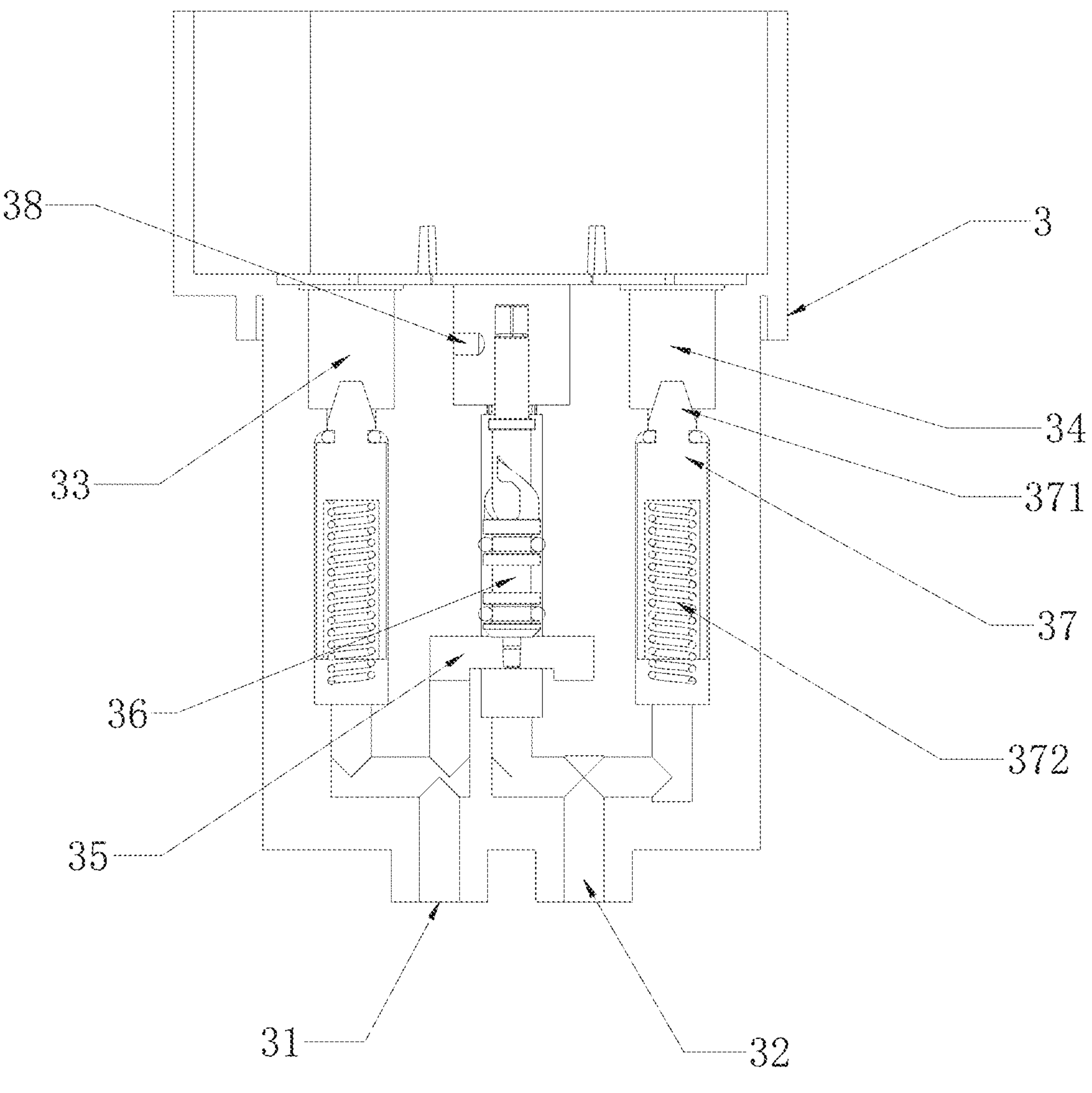
FIG. 12 is a schematic structural diagram of one connector base according to the present disclosure.

As shown in FIG. 12, the connector base 3 of the present disclosure is used to connect to an integrated waterway. The integrated waterway includes an unfiltered inlet waterway and a filtered outlet waterway. The connector base 3 includes a pipeline water inlet passage 31 and a pipeline water outlet passage 32, and a first water inlet passage 33 and a first water outlet passage 34 corresponding to the pipeline water inlet passage 31 and the pipeline water outlet passage 32, respectively. The connector base 3 is provided with a first shut-off valve 37 at the first water inlet passage 33, or first shut-off valves 37 are disposed in both the first water inlet passage 33 and the first water outlet passage 34. The first shut-off valve 37 includes a valve body 371 and a spring member 372 for urging the valve body 371 to close the first water inlet passage 33 or the first water outlet passage 34.

In one specific embodiment of the filter adapter 1, as shown in FIGS. 1 to 10, an adapter 1 for a filter 2 includes an adapter body 11 and two columnar shut-off valves 12. The adapter body 11 is provided with an accommodating cavity 111 for accommodating a head of the filter 2. The accommodating cavity 111 accommodates the columnar shut-off valves 12, which are restricted from rotating after installation, and are axially movable within the accommodating cavity 111. The columnar shut-off valves 12 are used to connect a fluid passages of the filter 2 with a fluid passage of the connector base 3.

Preferably, a main passage 112 is provided at an axial center of the accommodating cavity 111 of the adapter body 11, and two shut-off valve passages 113 are disposed adjacent to the main passage 112. The columnar shut-off valves 12 are axially movably disposed within the shut-off valve passages 113. The main passage 112 accommodates the head of the filter 2.

Specifically, a preferred structure of the columnar shut-off valve 12 is that one end of the columnar shut-off valve 12 is provided with a water outlet or a water inlet, and a first water inlet 122 or a first water outlet 123 is provided at a circumferential side wall position close to the other end of the columnar shut-off valve 12. First sealing rings 124 are disposed at positions above and below the first water inlet 122 or the first water outlet 123 of the columnar shut-off valve 12.

Preferably, the positions of the first water inlet 122 and the first water outlet 123 of the columnar shut-off valves 12 are at the same radial horizontal height, and the second water inlet 232 and the second water outlet 233 on the protruding portion 231 are also at the same radial horizontal height, thereby shortening the length of the columnar shut-off valves 12 and the protruding portion 231, reducing the overall length of the filter 2, and thereby facilitating transportation.

Preferably, an axial limiting structure is disposed at an upper end of the columnar shut-off valves 12 and the head of the filter 2. When the filter 2 axially moves, the columnar shut-off valves 12 are driven to move axially. The axial limiting structure is an engaging portion 121. In one embodiment, the columnar shut-off valves 12 are engaged with annular grooves at a lower end surface of the head of the filter 2. In another preferred embodiment, the columnar shut-off valves 12 are engaged with the protruding portion 231 of the filter 2. The protruding portion 231 of the filter 2 can rotate relative to the columnar shut-off valves 12, so that the first water inlet 122 and the first water outlet 123 of the columnar shut-off valves 12 and the second water inlet 232 and the second water outlet 233 on the protruding portion 231 always remain at the same height, thereby achieving precise alignment of the first water inlet 122 and the first water outlet 123 with the second water inlet 232 and the second water outlet 233.

The connection between the adapter body 11 and the filter 2 can be realized by a threaded connection or by engagement of guide grooves and clamping blocks. The adapter body 11 or the filter 2 is provided with a threaded connecting portion or guide grooves, and at least a portion of the guide grooves can be configured as helical grooves 133 or oblique grooves. Alternatively, the adapter body 11 is connected to the filter 2 via a threaded connecting portion or guide grooves provided on a separately formed connecting seat 13, and at least a portion of the guide grooves can be configured as helical grooves 133 or oblique grooves. The connecting seat 13 is detachably connected to the adapter body 11.

In a specific configuration, the connecting seat 13 may selectively include a first seat body 131 and a second seat body 132. The helical grooves 133 on the first seat body 131 and the second seat body 132 are in communication with each other. A gap 134 is formed between the first seat body 131 and the second seat body 132, and the gap 134 is used to accommodate the engaging portions 121 of the columnar shut-off valves 12. A latching plate 237 is disposed on the protruding portion 231 of the filter 2, and the latching plate 237 is engaged with the engaging portions 121 of the columnar shut-off valves 12. The latching plate 237 protrudes outward and is provided with a protrusion 238, which is engaged with the corresponding helical groove 133. The engaging portions 121 of the columnar shut-off valves 12 form a passage for allowing the protrusion 238 to pass through.

During assembly, the columnar shut-off valves 12 are first engaged with the filter 2, and the columnar shut-off valves 12 are placed in the shut-off valve passages 113. Then, the first seat body 131 and the second seat body 132 are fixedly mounted on the adapter body 11, and the engaging portions 121 of the columnar shut-off valves 12 are positioned within the gap 134. The gap between the first seat body 131 and the second seat body 132 can restrict the rotation of the columnar shut-off valves 12. Furthermore, a limiting structure may be provided in the shut-off valve passages 113 and/or in the accommodating cavity 111 of the adapter body 11 to restrict rotation of the columnar shut-off valves 12.

During installation, the protrusion 238 of the filter 2 rotates into the helical grooves 133, and during rotational installation of the filter 2, the columnar shut-off valves 12 are driven to synchronously move axially. During the movement, the engaging portions 121 of the columnar shut-off valves 12 can engage with the helical grooves 133 of the first seat body 131 and the second seat body 132. The protrusion 238 of the filter 2 rotates and passes through the passage formed by the engaging portions 121. When the protrusion 238 of the filter 2 rotates to reach the position within the helical grooves 133, the columnar shut-off valves 12 of the filter 2 simultaneously move axially to engage with the first shut-off valve 37 of the connector base 3. The second water outlet 233 on the protruding portion 231 of the filter 2 is aligned with the first water inlet 122 of the columnar shut-off valve 12, and the second water inlet 232 on the protruding portion 231 is aligned with the second water outlet 233 of the columnar shut-off valve 12, forming a through fluid passage. Meanwhile, the columnar shut-off valves 12 move axially to push the valve body 371 axially to open the first water inlet passage 33 or the first water outlet passage 34, thereby forming a through fluid passage with the connector base 3. Conversely, during disassembly, rotation of the filter 2 first causes the second water inlet 232 and the second water outlet 233 on the protruding portion 231 to be offset from the first water outlet 123 and the first water inlet 122 of the columnar shut-off valves 12, thereby cutting off the fluid passage on the filter 2. Synchronously, the shut-off valve on the connector base 3 cuts off the fluid passage on the connector base 3 due to axial withdrawal of the columnar shut-off valves 12. Therefore, during assembly and disassembly, the fluid passages on both the filter 2 and the connector base 3 are immediately cut off, minimizing fluid leakage as much as possible during disassembly.

Preferably, the filter adapter 1 of the present disclosure can also cooperate and connect with the connector base 3, which is internally provided with the valve body 371 of the diverter valve. Specifically, the connector base 3 is provided with a first valve body 36 therein, and the first valve body 36 controls a diversion passage 35 in communication with the pipeline water inlet passage 31 and the pipeline water outlet passage 32. A diverter switch 234 is disposed on the filter 2, and the diverter switch 234 is used to drive the first valve body 36 to open or close the diversion passage 35. The main passage 112 of the filter 2 adapter 1 is used for the passage of the diverter switch 234.

Preferably, the diverter switch 234 is disposed at a head of the protruding portion 231 of the filter 2 and is engaged with the first valve body 36. Rotation of the bottle body of the filter 2 drives rotation of the diverter switch 234, thereby driving rotation and axial movement of the first valve body 36.

The connection between the filter 2 and the connector base 3 can be realized by means of a direct locking connection between the filter 2 to the connector base 3, or by fixing the filter 2 to the adapter body 11, and the adapter body 11 is fixedly connected to the connector base 3.

The present disclosure provides a preferred connection manner between the filter 2 and the connector base 3, in which the filter 2 is fixed to the filter 2 adapter 1, and the filter 2 adapter 1 is fixedly connected to the connector base 3. A locking pin 38 is disposed in the connector base 3.

A mounting cylinder 114 is disposed at the axial center of a lower end surface of the adapter body 11. The mounting cylinder 114 is used to allow the diverter switch 234 to pass through. A locking member 14 is mounted on the mounting cylinder 114, and the locking member 14 is used to form a locking connection with the connector base 3. The diverter switch 234 rotates to drive the locking member 14 to lock with the connector base 3. The locking member 14 is provided with a linkage member cooperating with the filter 2. The linkage member converts the rotational motion or axial motion of the filter 2 to drive the locking structure to lock with the connector base 3.

Figure 6:
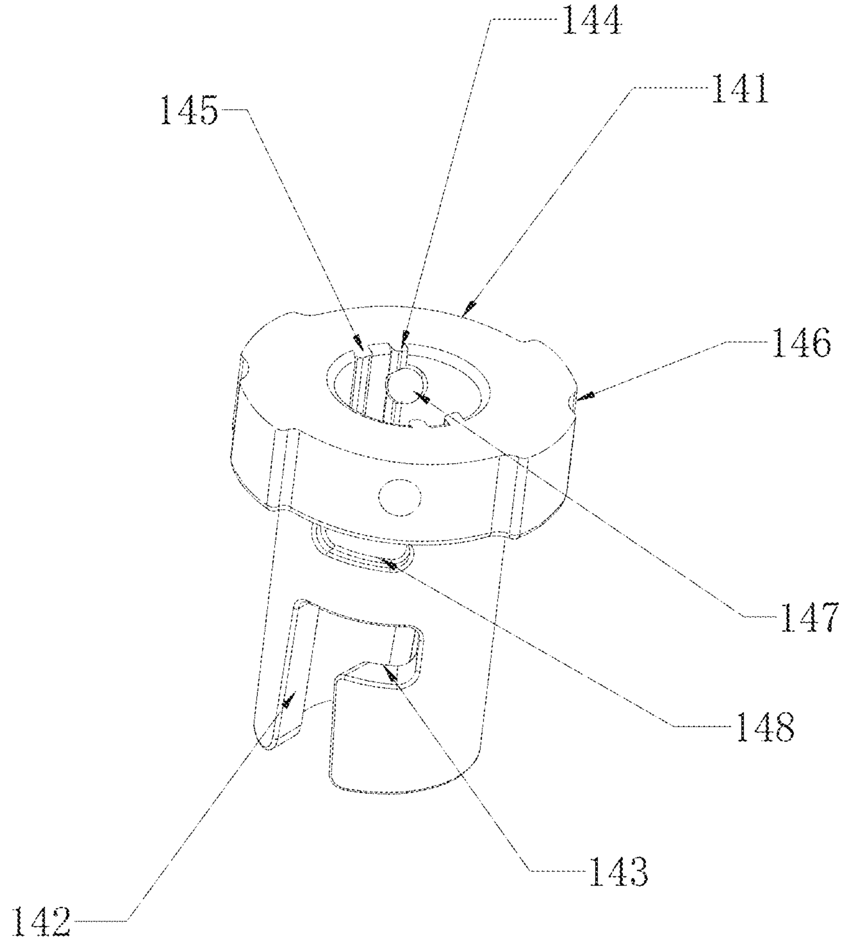
FIG. 6 is a schematic structural diagram of a locking sleeve according to the present disclosure.
Figure 7:
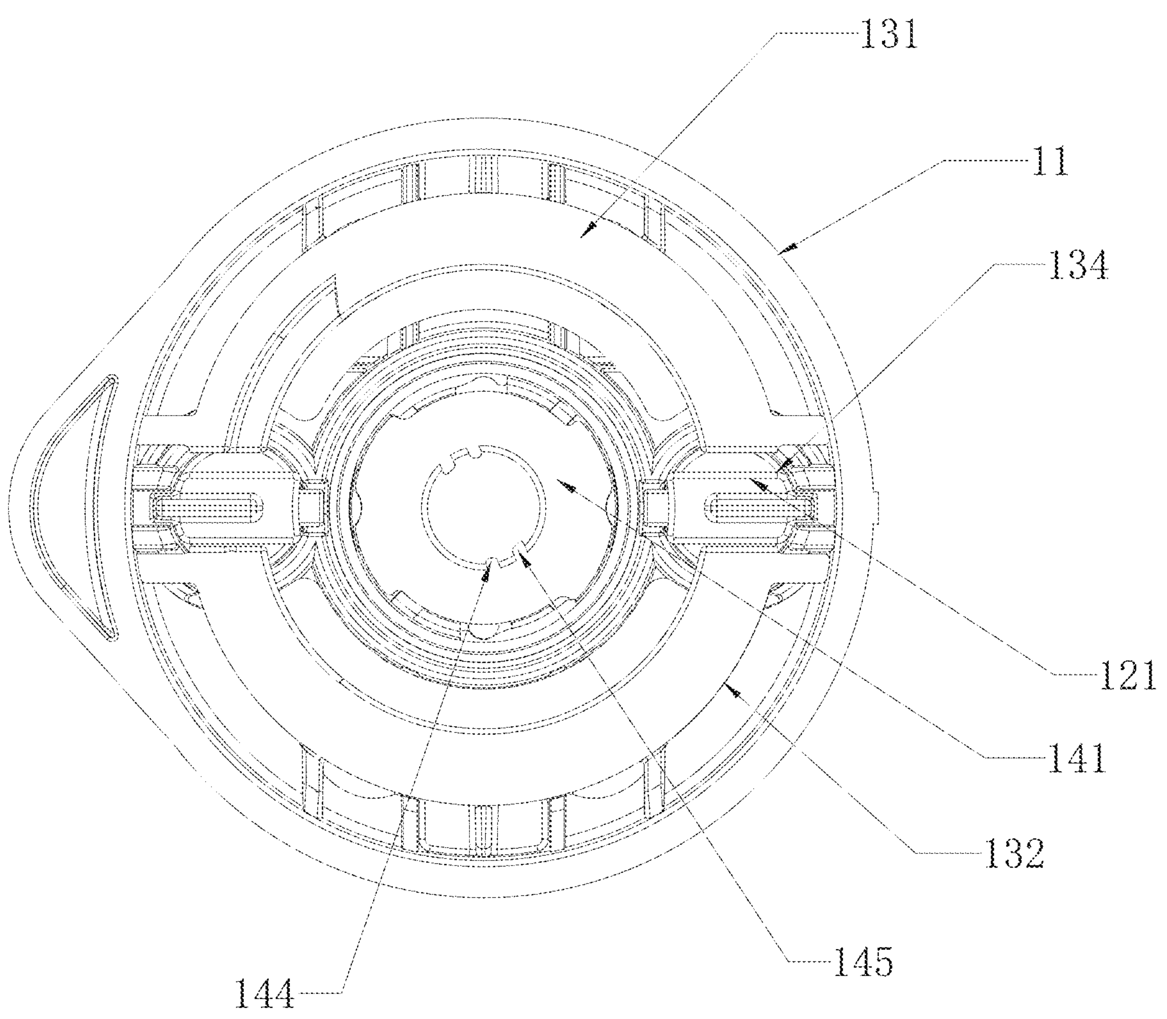
FIG. 7 is a structural schematic diagram of the filter adapter with the connecting seat from a top perspective according to the present disclosure.
Figure 8:
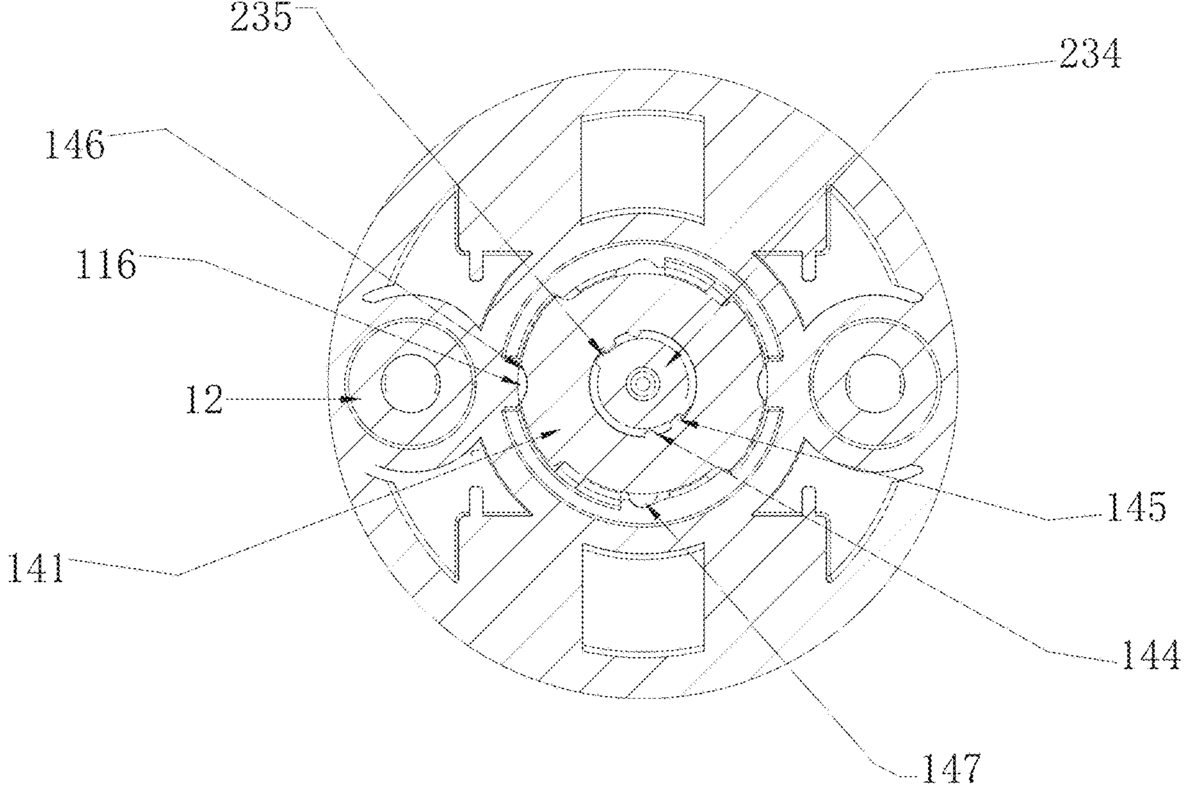
FIG. 8 is a schematic diagram of an installation structure among a diverter switch, a locking sleeve and an adapter body when the filter is installed in position according to the present disclosure.
Figure 9:
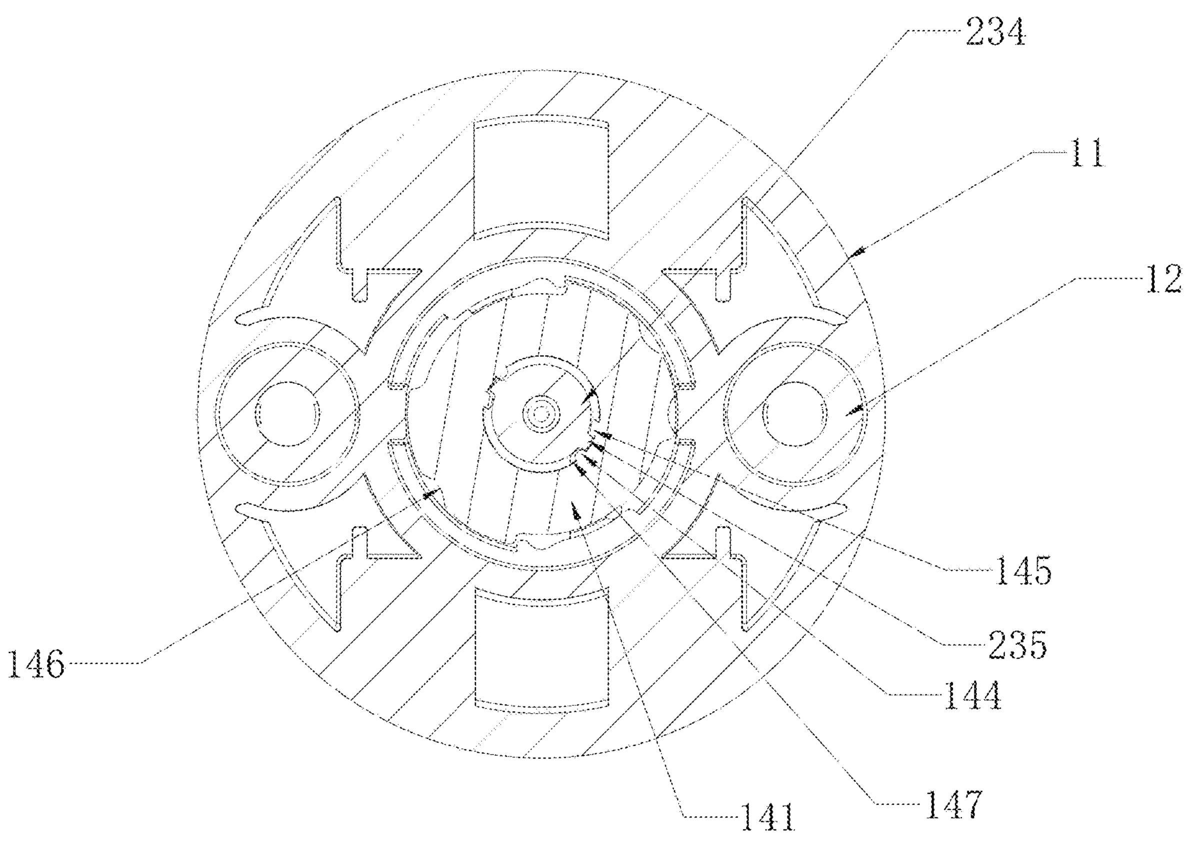
FIG. 9 is a schematic diagram of the installation structure among the diverter switch, the locking sleeve, and the adapter body when the filter starts to be installed according to the present disclosure.
Figure 10:
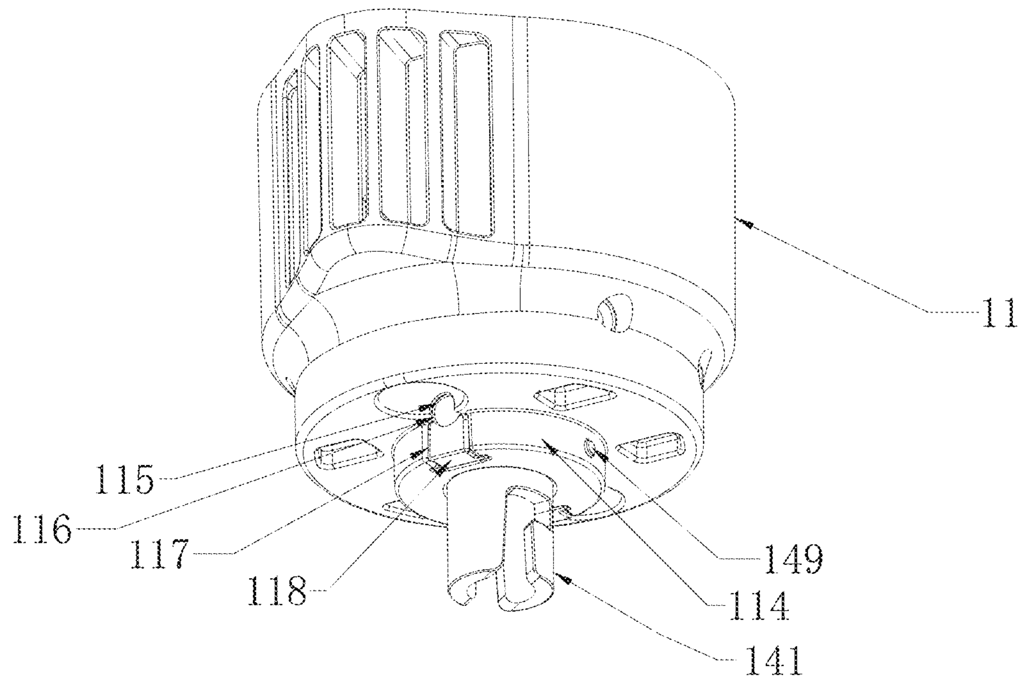
FIG. 10 is a schematic diagram of an installation structure of the locking sleeve according to the present disclosure.

Preferably, the locking member 14 is rotatably connected to the mounting cylinder 114 at a defined rotational angle. The linkage member converts the rotational motion of the filter 2 to drive the locking structure to lock with the connector base 3. The locking member 14 is preferably configured as a locking sleeve 141, as shown in FIG. 6. The locking sleeve 141 is provided with an opening at a lower end thereof. The opening extends upward to form an alignment groove 142, and the alignment groove 142 circumferentially extends to form a locking groove 143. The cooperating connector base 3 is provided with a locking pin 38 therein. At an initial installation position, the opening and the alignment groove 142 of the locking sleeve 141 are aligned with the locking pin 38. After the filter 2 drives the locking sleeve 141 to rotate, the locking groove 143 of the locking sleeve 141 retains the locking pin 38, thereby restricting the adapter body 11 from being axially disengaged from the connector base 3.

A circumferential outer wall of the locking sleeve 141 is provided with a positioning arc groove 148, and a second dowel pin 149 on the mounting cylinder 114 axially retains the locking sleeve 141 mounted on the mounting cylinder 114. The positioning arc groove 148 allows the second dowel pin 149 to slide relative to the locking sleeve 141 within a preset angle.

Preferably, as shown in FIGS. 6 to 9, a specific embodiment of the linkage member is that the locking sleeve 141 cooperates with the diverter switch 234 on the filter 2. Preferably, a convex rib 235 is provided on an outer wall surface of the diverter switch 234, and protrusions are provided on an inner wall of the locking sleeve 141. Through the cooperation of the convex rib 235 and the protrusions, the diverter switch 234 drives the locking sleeve 141 to rotate. When the locking sleeve rotates to a preset angle, the convex rib 235 and the protrusions are released from abutment, so that the filter 2 and the diverter switch 234 can continue to rotate to complete the assembly of the filter 2 with the connector base 3.

Preferably, the protrusions provided on the inner wall of the locking sleeve 141 include a start-position protrusion 144 and an end-position protrusion 145. When at an initial position, the convex rib 235 of the diverter switch 234 is located between the start-position protrusion 144 and the end-position protrusion 145. The end-position protrusion 145, on the one hand, can prevent reverse rotation of the filter 2, and on the other hand, when the filter 2 is rotationally installed in place, the end-position protrusion 145 restrains further rotation of the filter 2.

Preferably, the locking sleeve 141 is further provided with a safety structure, which is used for further linkage, such that the locking sleeve 141 remains locked with the diverter switch 234 at the initial position, and is released from locking with the diverter switch 234 when the locking sleeve 141 rotates to a preset position. The safety structure is preferably a first dowel pin 147 that is radially movable on the locking sleeve 141. A guide protrusion is provided on an inner wall of the mounting cylinder 114, and a radial thickness of the guide protrusion decreases at the end in a rotation direction. When the first dowel pin 147 is at a start position of the guide protrusion, the guide protrusion retains the first dowel pin 147 projecting to abut against the convex rib 235 on the diverter switch 234. When the first dowel pin 147 is located at an end position of the guide protrusion, the guide protrusion releases the first dowel pin 147 from projecting toward the inner wall of the locking sleeve 141. Preferably, an anti-detachment protrusion is further provided at a starting end and/or a tail end of the guide protrusion in the rotation direction.

At least a limiting structure for restricting the rotation angle is provided between the locking sleeve 141 and the mounting cylinder 114, and the limiting structure is one or more of: a limiting protrusion cooperating with another limiting protrusion, or a limiting protrusion cooperating with a limiting groove 146.

Preferably, a limiting protrusion is provided on the outer wall of the locking sleeve 141, and the limiting protrusion cooperates with the guide protrusion on the inner wall of the mounting cylinder 114 to restrict the rotation angle of the locking sleeve 141.

Further preferably, a limiting structure for restricting the rotational angle is further disposed between the locking sleeve 141 and the columnar shut-off valves 12. Specifically, a limiting groove 146 is provided on the locking sleeve 141, preferably on the limiting protrusion, and a mounting hole 115 is formed through the side wall of the mounting cylinder 114. A limiting block 116 that is movable axially along the mounting hole 115 is disposed in the mounting hole 115, and the limiting block 116 is preferably selected as a steel ball. Clearance recesses 125 are provided on one side of the columnar shut-off valves 12 close to a section of a lower end corresponding to the limiting block 116; and when the columnar shut-off valves 12 move downward until the clearance recesses 125 pass the position of the limiting block 116, the columnar shut-off valves reach the preset positions. The outer wall surfaces of the columnar shut-off valves 12 push the limiting block 116 to move toward the locking sleeve 141 and urge the limiting block to abut against the limiting groove 146 of the locking sleeve 141.

The limiting block 116 is detachably connected to the mounting cylinder 114. Preferably, the mounting structure is that a mounting notch 117 is provided at a lower end of the mounting cylinder 114, and a mounting seat 118 is detachably connected in the mounting notch 117. The mounting seat 118 and the mounting notch 117 form a mounting hole 115 for accommodating the limiting block 116.

Preferably, the length of the clearance recess 125 is configured such that the preset position and the end position of the locking sleeve 141 at the preset rotation angle are synchronized.

Specifically, during the driving process, at the start position, the convex rib 235 of the diverter switch 234 is located between the start-position protrusion 144 and the end-position protrusion 145. When rotating to the preset angle, the second dowel pin 149 of the mounting cylinder 114 abuts against a wall of the positioning arc groove 148 of the locking sleeve 141, and/or a second limiting protrusion of the mounting cylinder 114 abuts against and the guide protrusion, and/or the side walls of the columnar shut-off valves 12 push the limiting block 116 to be positioned in the limiting groove 146. Under the action of the second dowel pin 149 and/or the guide protrusion of the mounting cylinder 114, the convex rib 235 and the start-position protrusion 144 are released from abutment, allowing the diverter switch 234 to continue rotating until the diverter switch 234 abuts against the end-position protrusion and rotation stops.

By providing the locking member 14 on the adapter body 11, installation structures of the filter 2 and the filter adapter 1 are realized. The installation structures of the adapter 1 and the connector base 3 are arranged independently to enhance the independence and strength of each installation structure, thereby avoiding low connection strength between the filter 2 and the connector base 3 due to a limited installation space. Moreover, by linking the locking member 14 with the filter 2, installation and connection of the filter 2 with the connector base 3 can be completed by further rotation. This installation method is more easily accepted by consumers, allowing consumers to directly replace and install the filter 2.

In addition, in an initial state, the columnar shut-off valves 12, which engage the filter 2 with the connector base 3, can be partially or entirely accommodated within the accommodating cavity 111 of the adapter body 11, reducing the risk of damage during transportation.

The above are merely preferred embodiments of the present disclosure, and the protection scope of the present disclosure is not limited only to the above embodiments. All technical solutions falling within the concept of the present disclosure shall fall within the protection scope of the present disclosure. It should be noted that for those of ordinary skill in the art, several improvements and modifications made without departing from the principles of the present disclosure shall also be considered as falling within the scope of protection of the present disclosure.

The invention claimed is:

1. A filter adapter, configured to connect a connector base and a filter, comprising:

an adapter body, which is provided with an accommodating cavity for accommodating a head of the filter, wherein the accommodating cavity is provided with at least two shut-off valve passages; and at least two columnar shut-off valves, configured to connect a fluid passage of the filter with a fluid passage of the connector base, wherein the at least two columnar shut-off valves axially move within the shut-off valve passages and are restricted from rotating;

wherein a locking member is disposed on the adapter body and configured to form a locking connection with the connector base; the locking member is provided with a linkage member cooperating with the filter; and the linkage member converts rotational motion of the filter to drive the locking member to lock with the connector base; and wherein the accommodating cavity is configured to allow a diverter switch at the head of the filter to pass therethrough, and the linkage member converts rotational motion of the diverter switch to drive the locking member to lock with the connector base.

2. The filter adapter according to claim 1, wherein an upper end of each of the columnar shut-off valves is connected to an engaging portion, and the engaging portion is configured to be engaged with the head of the filter and restricts axial movement of the columnar shut-off valve relative to the filter.

3. The filter adapter according to claim 2, wherein the adapter body is provided with a first seat body and a second seat body, and guide grooves on the first seat body and the second seat body are in communication with each other; each of the guide grooves comprises at least an oblique or helical segment; and a gap is formed between the first seat body and the second seat body and configured to accommodate the engaging portions of the columnar shut-off valves.

4. The filter adapter according to claim 1, wherein the locking member is located at an axial center of a lower end surface of the adapter body.

5. The filter adapter according to claim 1, wherein the locking member is rotatably connected with the adapter body at a defined rotational angle.

6. The filter adapter according to claim 5, wherein the locking member is a locking sleeve disposed on the adapter body, openings are formed at a lower end of the locking sleeve, each of the openings extends upward to form an alignment groove, and the alignment groove circumferentially extends to form a locking groove; and the locking grooves are configured to lockingly engage with the connector base, and the locking sleeve is rotatably connected to the adapter body at a defined rotational angle.

7. The filter adapter according to claim 6, wherein the linkage member comprises at least a start-position protrusion provided on an inner wall surface of the locking sleeve; the start-position protrusion abuts against the filter to synchronously move during rotation of the filter, and at least one limiting structure for restricting a rotational angle is disposed between the locking sleeve and the adapter body; and after the locking sleeve rotates relative to the adapter body to a limiting position, the start-position protrusion starts to disengage from abutment with the filter.

8. The filter adapter according to claim 7, wherein the adapter body is provided with a mounting cylinder, and the locking sleeve is disposed in the mounting cylinder in a limited rotation manner; a mounting hole is formed through a side wall of the mounting cylinder, and a limiting block that is movable axially along the mounting hole is disposed in the mounting hole; the locking sleeve is provided with a limiting groove cooperating with the limiting block; and when the columnar shut-off valves move axially to preset positions, outer wall surfaces of the columnar shut-off valves push the limiting block to move toward the locking sleeve and urge the limiting block to abut against the limiting groove of the locking sleeve.

9. The filter adapter according to claim 8, wherein clearance recesses are provided on one side of the columnar shut-off valves close to a section of a lower end corresponding to the limiting block; and when the columnar shut-off valves move downward until the clearance recesses pass the position of the limiting block, the columnar shut-off valves reach the preset positions.

10. A filter system comprising a filter, wherein the filter comprises a bottle body, filter cartridges accommodated in the bottle body, and an end cover configured to seal the bottle body, wherein the filter is provided with a cylindrical protruding portion extending forward, and a second water inlet and a second water outlet are provided circumferentially on the protruding portion; and wherein the filter system further comprises a connector base configured to connect to an integrated waterway and a filter adapter configured to connect the connector base and the filter, wherein the filter adapter comprises an adapter body and at least two columnar shut-off valves; the adapter body is provided with an accommodating cavity for accommodating a head of the filter, and the accommodating cavity is provided with at least two shut-off valve passages; the columnar shut-off valves move axially within the shut-off valve passages and are restricted from rotating, and the columnar shut-off valves are configured to connect a fluid passage of the filter with a fluid passage of the connector base; a first water inlet and a first water outlet are provided on radial side walls of the two columnar shut-off valves, respectively; the filter moves axially while rotating, and axial movement of the filter drives the two columnar shut-off valves to move axially within the accommodating cavity; and when the filter rotates to a preset position, the first water inlet and the first water outlet of the two columnar shut-off valves are driven to be in communication with the second water inlet and the second water outlet of the protruding portion, respectively; and wherein the connector base is provided with a first shut-off valve at least in a water inlet passage; the filter axially moves while rotating, and axial movement of the filter drives the two columnar shut-off valves to axially move within the accommodating cavity; and when the filter rotates to the preset position, water passages of the two columnar shut-off valves are driven to be in communication with the second water inlet and the second water outlet of the protruding portion, respectively, and the columnar shut-off valves engage with the first shut-off valves and move and open the first shut-off valves, wherein each of the first shut-off valves comprises a valve body and a spring member configured to enable the valve body to close a first water inlet passage or a first water outlet passage, and when the adapter and the connector base are assembled in position, the columnar shut-off valves move axially to push the valve body axially to open the first water inlet passage or the first water outlet passage.

11. The filter system according to claim 10, wherein an upper end of each of the columnar shut-off valves is connected to an engaging portion, and the engaging portion is configured to be engaged with the head of the filter and restricts axial movement of the columnar shut-off valve relative to the filter.

12. The filter system according to claim 11, wherein the adapter body is provided with a first seat body and a second seat body, and guide grooves on the first seat body and the second seat body are in communication with each other; each of the guide grooves comprises at least a segment extending obliquely or helically; and a gap is formed between the first seat body and the second seat body and configured to accommodate the engaging portions of the columnar shut-off valves.

13. The filter system according to claim 10, wherein a first valve body for controlling flow diversion is disposed in the connector base; a diverter switch is formed at a front end of the protruding portion of the filter and configured to drive the first valve body in the connector base, and a main passage is provided at an axial center of the accommodating cavity of the adapter body and configured to allow the diverter switch at the head of the filter to pass through.

14. The filter system according to claim 13, wherein the adapter body is provided with a locking member configured to form a locking connection with the connector base; the locking member is located at an axial center of a lower end surface of the adapter body; and the locking member is provided with a linkage member cooperating with the diverter switch, and the linkage member converts rotational motion of the diverter switch to drive the locking member to lock with the connector base.

15. The filter system according to claim 14, wherein the linkage member converts the rotational motion of the diverter switch to drive the locking member to lock with the connector base, and the locking member is rotatably connected to the adapter body at a defined rotational angle.

16. The filter system according to claim 14, wherein the locking member comprises a locking sleeve, and the locking sleeve is rotatably connected to the adapter body at a defined rotational angle; openings are formed at a lower end of the locking sleeve, each of the openings extends upward to form an alignment groove, and the alignment groove circumferentially extends to form a locking groove; and a locking pin is disposed on the connector base, and the locking grooves are configured to lockingly engage with the locking pin of the connector base.

17. A method for assembling the filter system according to claim 16, comprising the following steps:

(1) the two columnar shut-off valves of the adapter being aligned with the water inlet passage and a water outlet passage of the connector base, respectively; wherein the diverter switch, the columnar shut-off valves, the first shut-off valve, and the first valve body are in initial positions; the second water inlet and the second water outlet of the filter are offset from the first water inlet and the first water outlet of the columnar shut-off valves; and the first shut-off valve at least closes the water inlet passage of the connector base, and the first valve body opens a diversion passage of the connector base;

(2) the filter being threadedly engaged with the adapter by rotation, and the filter being rotated to a first preset angle such that the filter drives the columnar shut-off valves to axially move to a first preset height, the diverter switch drives the locking member to rotate to the first preset angle, and the locking sleeve locks with the connector base; and (3) the filter being further rotated to a second preset angle such that the diverter switch of the filter is unlocked from the locking member; the second water inlet and the second water outlet of the filter are in communication with the first water inlet and the first water outlet of the columnar shut-off valves, respectively; and the filter drives the columnar shut-off valves to axially move to a second preset height, the columnar shut-off valves push the first shut-off valves to open, and the diverter switch fully opens the first valve body in the connector base.

* * * * *